Nov. 28, 1967 — A. PAREDES — 3,354,643
HYDROKINETIC TORQUE CONVERTER MECHANISM WITH
VARIABLE GEOMETRY STATOR BLADING
Filed May 18, 1966 — 4 Sheets-Sheet 1

INVENTOR:
ANDREW PAREDES
BY
ATTORNEYS.

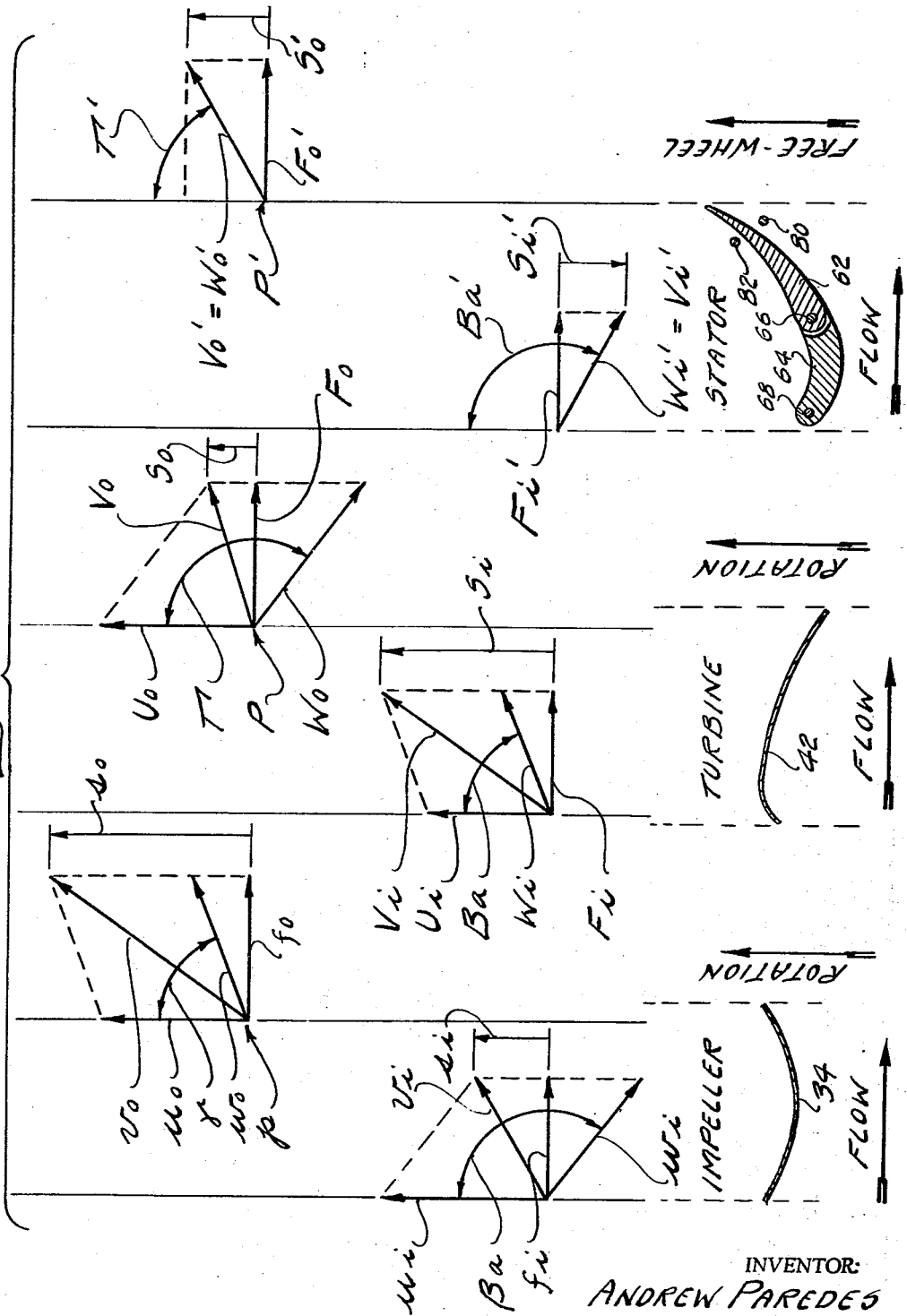

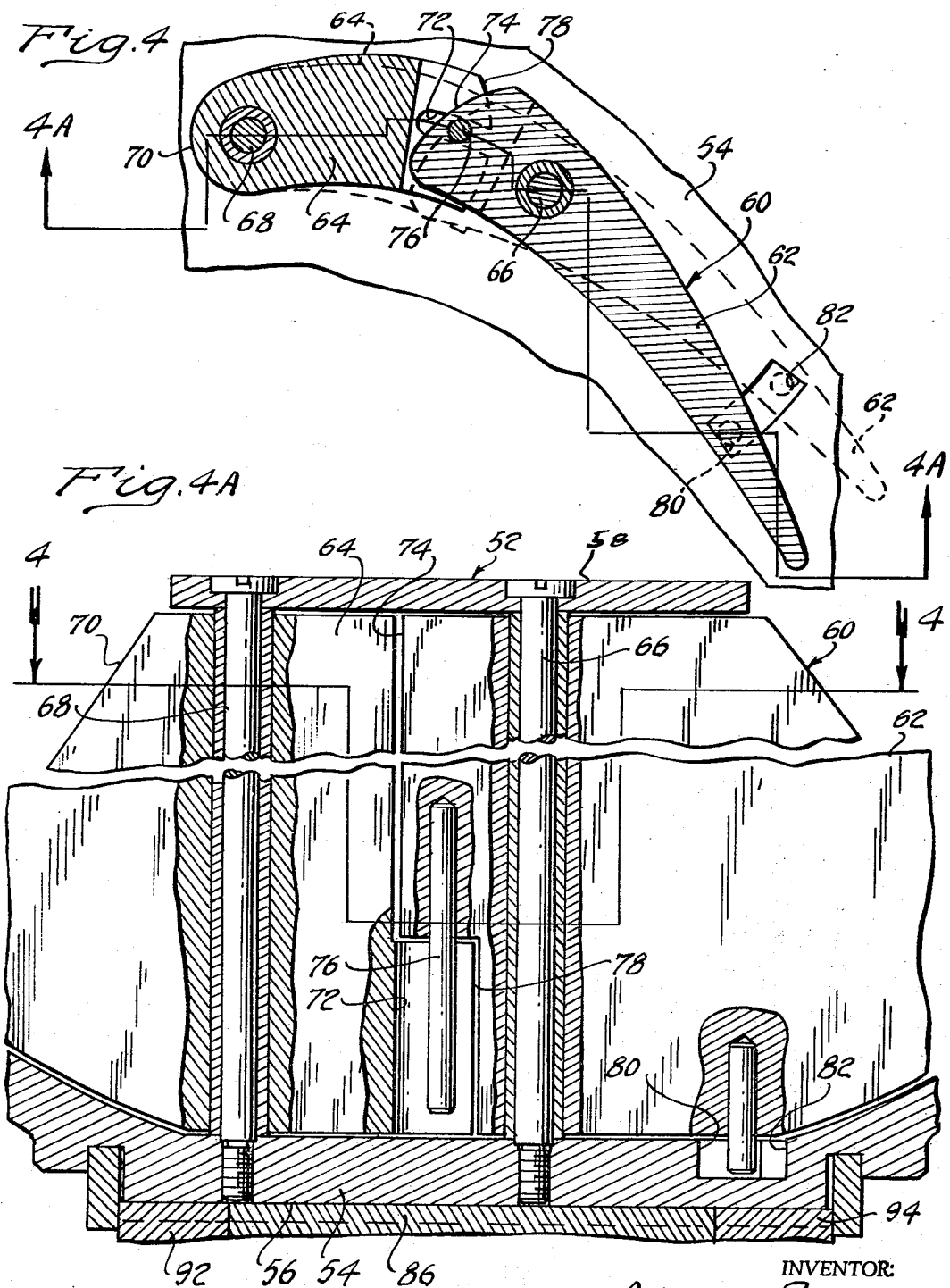

United States Patent Office 3,354,643
Patented Nov. 28, 1967

3,354,643
HYDROKINETIC TORQUE CONVERTER MECHANISM WITH VARIABLE GEOMETRY STATOR BLADING
Andrew Paredes, Wayne, Mich., assignor to Ford Motor Company, Dearborn, Mich., a corporation of Delaware
Filed May 18, 1966, Ser. No. 551,012
10 Claims. (Cl. 60—54)

My invention relates generally to hydrokinetic torque converter mechanisms for use in an automatic vehicle driveline. More particularly, it relates to improvements in blading for the stator of a hydrokinetic torque converter mechanism.

It is the function of a bladed stator in a hydrokinetic torque converter to change the magnitude of the tangential component of the absolute, fluid flow, velocity vector for a particle of fluid passing through the torus circuit of the converter. The torque reaction resulting from the change in the velocity vector for the fluid is distributed to the stationary housing portion of the transmission mechanism through an overrunning brake. This torque reaction is experienced whenever the converter mechanism functions to multiply torque.

The direction of the absolute fluid flow velocity vector for particles of fluid approaching the entrance region of the bladed stator section changes throughout a wide range of angles as the converter speed ratio changes from zero to the so-called coupling point. The speed ratio, for purposes of this description, is defined as the turbine speed divided by the impeller speed. Whenever the speed ratio is less than the coupling point, the converter functions to multiply torque. The maximum torque ratio occurs when the speed ratio is zero. It is at this point also that the toroidal fluid flow velocity is at a maximum.

The coupling point is that point at which the stator no longer functions to absorb reaction. The fluid flow velocity vector for the fluid passing through the bladed passages of the stator is disposed so that the direction of its absolute fluid flow component matches substantially the bladed exit angle of the stator. When this point is reached, the torque ratio is unity and the speed ratio may be approximately .87:1.

If the angularity of the blades of the stator is chosen so that the tangential component of the absolute fluid flow velocity vector at the exit section of the impeller for any given torus flow will be a maximum, the torque ratio for the converter unit will be a maximum. But during operation at the intermediate speed ratios and at the speed ratios near the coupling point, the efficiency of the converter mechanism will be compromised. On the other hand, if the converter blade geometry is chosen so that the tangential component of the absolute fluid flow velocity vector at the exit section of the stator will be of a reduced magnitude for any given torus flow, the efficiency at the high speed ratios will be improved although the torque ratio at low speed ratios will be impaired. It thus is necessary to strike a compromise in the design of the stator blading so that adequate torque multiplication can be obtained at low speed ratios without unduly impairing operating efficiency at high speed ratios.

In certain prior art arrangements an attempt has been made to improve upon converter performance without seriously impairing coupling efficiency by adjustably mounting the blades of the stator member so that a different blade geometry is available at low speed ratios than that which is available at higher speed ratios. This usually is done by pivotally mounting each of the individual stator blades for rotation about separate radial axes. It has been found, however, that although such adjustably mounted stator blades can, under certain circumstances, provide an optimum exit blade geometry for the stator blading, the adjustment of the blades provides an unfavorable entrance angle at the flow entrance region of the stator blades with respect to the fluid flow velocity vector leaving the flow exit section of the turbine. When the blading is adjusted to the high performance position, the entrance angle for the stator blading becomes seriously misaligned with respect to the direction of the absolute fluid flow velocity vector at the flow entrance region of the stator. Thus any benefit that might be enjoyed by adjustably controlling the exit angle of the stator is partially offset by the adverse influence of an unfavorable entrance angle for the flow vectors at the flow exit region of the turbine. In a similar fashion the entrance angle that is presented to the flow vectors that exist during operation at the coupling point is unfavorable for optimum crusing efficiency notwithstanding the favorable exit angle that is obtained when the blades are adjusted to the crusing position and when the converter approaches high speed ratio operation.

It is an object of my invention to overcome this deficiency in prior art mechanisms by providing a converter having adjustable stator blades in which the entrance angle as well as the exit angle can be controlled to provide optimum flow entrance and flow exit conditions regardless of speed ratio variations.

It is a further object of my invention to provide a hydrokinetic torque converter mechanism having adjustable stator blading situated in multiple sections wherein the angularity of each section can be adjusted to provide optimum entrance angles as well as the optimum exit angle for the flow passing through the bladed passages of the stator.

It is a further obpject of my invention ot provide a hydrokinetic torque converter mechanism with a multiple section stator wherein the adjustable, bladed portions of one section are effective to transmit motion to the adjustable, bladed portions of the other section.

Further objects and features of my invention will become apparent from the following description and from the accompanying drawings in which;

FIGURE 3 is a vector diagram schematically illustrating the vectors for the fluid flow at the exit section for each of the members of the converter mechanism of FIGURE 1;

FIGURE 4 is a cross-sectional subassembly view of the stator of FIGURE 1 and is taken along section line 4—4 of FIGURE 1; and FIGURE 4A is a cross-sectional view taken along the plane of section line 4A—4A of FIGURE 4.

Figure 1:
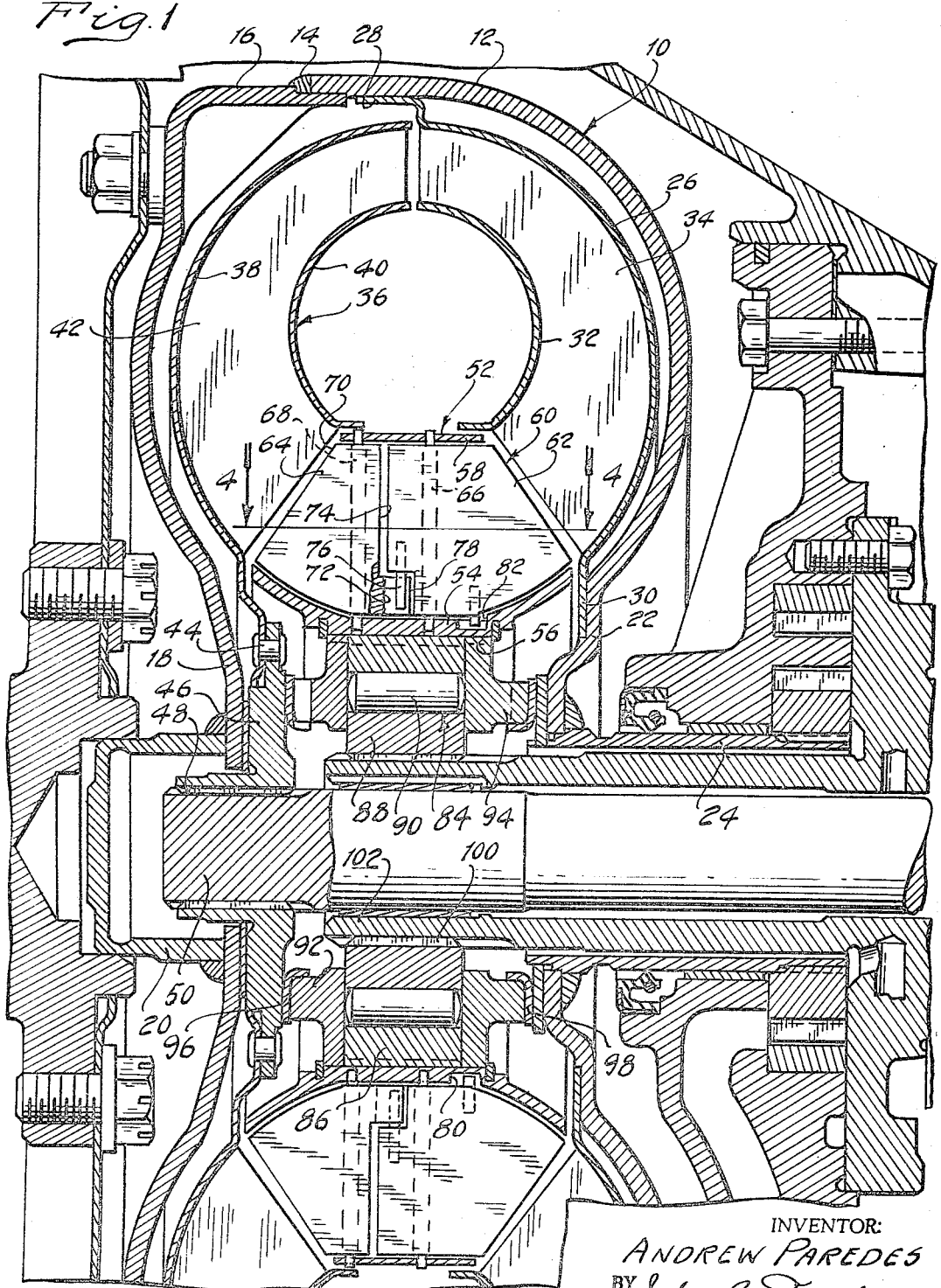
FIGURE 1 shows in longitudinal cross-sectional form an assembly or a hydrokinetic torque converter embodying my improvement.

In FIGURE 1, numeral 10 designates generally an impeller shell. It includes a first shell part 12 of somewhat semi-toroidal shape. Part 12 is connected by means of a peripheral weld 14 to a second impeller shell part 16. Shell part 16 and shell part 12 define a closed shell which encloses the members of the torque converter. A hub 18 of the shell part 16 is connected to a pilot member 20 which is received within a pilot recess formed in the end of an internal combustion engine crankshaft. The hub of shell part 12 is shown at 22. It is welded to a sleeve shaft 24 which may be journalled in the usual fashion within a bearing opening formed in a transverse supporting wall for the stationary transmission housing.

The outer impeller shroud 26 is connected by welding at its periphery 28 to the inner surface of the shell part 12. Its inner periphery 30 may be secured by welding to the hub 22.

An inner impeller shroud shown at 32 cooperates with shroud 26 to define radial outflow passages. Impeller blades 34 are situated between the shrouds 32 and 26.

A turbine 36 situated within the shell 10 includes an outer turbine shroud 38, an inner turbine shroud 40 and turbine blades 42 situated between the shrouds 38 and 40. The blades 42 cooperate with the shrouds 38 and 40 to define radial inflow passages.

The radially inward margin of the shroud 38 is connected by rivets 44 to a turbine hub 46, which is internally splined at 48 to a turbine shaft 50. This shaft in turn may be connected in the usual fashion to a power input gear element of a multiple speed ratio power transmission mechanism in an automotive driveline.

Located between the flow exit section of the blades 42 and the flow entrance section of the blades 34 is a stator 52. It includes a shroud 54 which is formed with a central opening 56. It includes also a second shroud 58. Located between the shrouds 54 and 58 are stator blades 60. Each blade 60 is arranged in two sections, namely a trailing section 62 and a leading section 64.

As seen in FIGURE 4, each section 62 and 64 is mounted upon a separate pivot shaft shown at 66 and 68, respectively. Blade section 64 includes a rounded nose 70. The camber progressively decreases from the leading edge to the trailing edge. The trailing edge comprises a blunt region adjacent in which is situated the leading edge 74 of the blade section 62, the latter registering with the trailing edge of blade section 64 to define an articulated, continuous blade. The leading edge 74 carries a radially disposed pin 76 which is situated within a groove 72 formed in the radially inward part of the trailing edge of the blade section 64 as shown at 78.

Each blade section 62 and 64 can pivot about its respective shaft 66 or 68. Radially inward and outward ends of the shafts are received within cooperating openings formed in the shroud 54 and the shroud 58, respectively. The trailing edge of the blade section 62 is adapted to engage either one of the pair of stops 80 and 82 which may be carried by the shroud 54. When the articulated blade 60 assumes the full line position shown at FIGURE 4, the trailing edge of blade section 62 engages stop 80. At this time the pin 76 slides outwardly within the slot 72 for the blade section 64. At the same time the blade section 64 is adapted to rotate about the shafts 68 in a counterclockwise direction as viewed in FIGURE 4.

On the other hand, if the articulated blade 60 assumes the dotted line position, the slip pin joint provided by the pin 76 in the slot 74 permits the blade section 64 to rotate in a clockwise direction as the trailing edge of the blade section 62 engages the stop 82.

It is apparent from the foregoing description that the angularity of the entrance region of the blade 60 is altered whenever the trailing edge geometry is altered. The angularity of the entrance region of the blade section 64 increases whenever the angularity of the trailing edge region of the blade section 62 decreases. Conversely, an increase in the trailing edge angularity results in a decrease in the leading edge angularity.

Regardless of the position that the blade elements 60 assume, a continuous uninterrupted flow path through the blades of the stator is achieved. When the blades 60 assume the full line position shown in FIGURE 4, the converter mechanism is conditioned for high torque ratio operation. Furthermore, the so-called convertor size factor is increased thereby permitting higher engine speed when the converter is stalled. The size factor for purposes of this description is defined as the impelled speed divided by the square root of the impeller torque.

The stator is anchored against rotation in a direction opposite to the direction rotation of the impeller in the turbine, but is capable of freewheeling in the other direction during coupling performance of the converter mechanism. This freewheeling action is achieved by means of an overrunning brake 84 which includes a cammed outer race 86 received within the opening 56 of the shroud 54. An overrunning brake inner race 88 cooperates with the race 86 and with rollers 90, which establish a camming action with the cammed race 86 to prevent motion of the stator 60 in the direction of rotation of the impeller and the turbine.

Thrust members, which serve as spacers, are provided on either side of the rollers 90, as shown at 92 and 94. A thrust ring 96 is situated between the hub of 46 and the spacer 92. A corresponding thrust ring 98 is situated between the hub 22 of the impeller shell part 12 and the spacer 94.

Race 88 may be splined at 100 to a stationary stator sleeve shaft 102. This in turn may be connected to the stationary transmission housing in the usual fashion.

Figure 2:
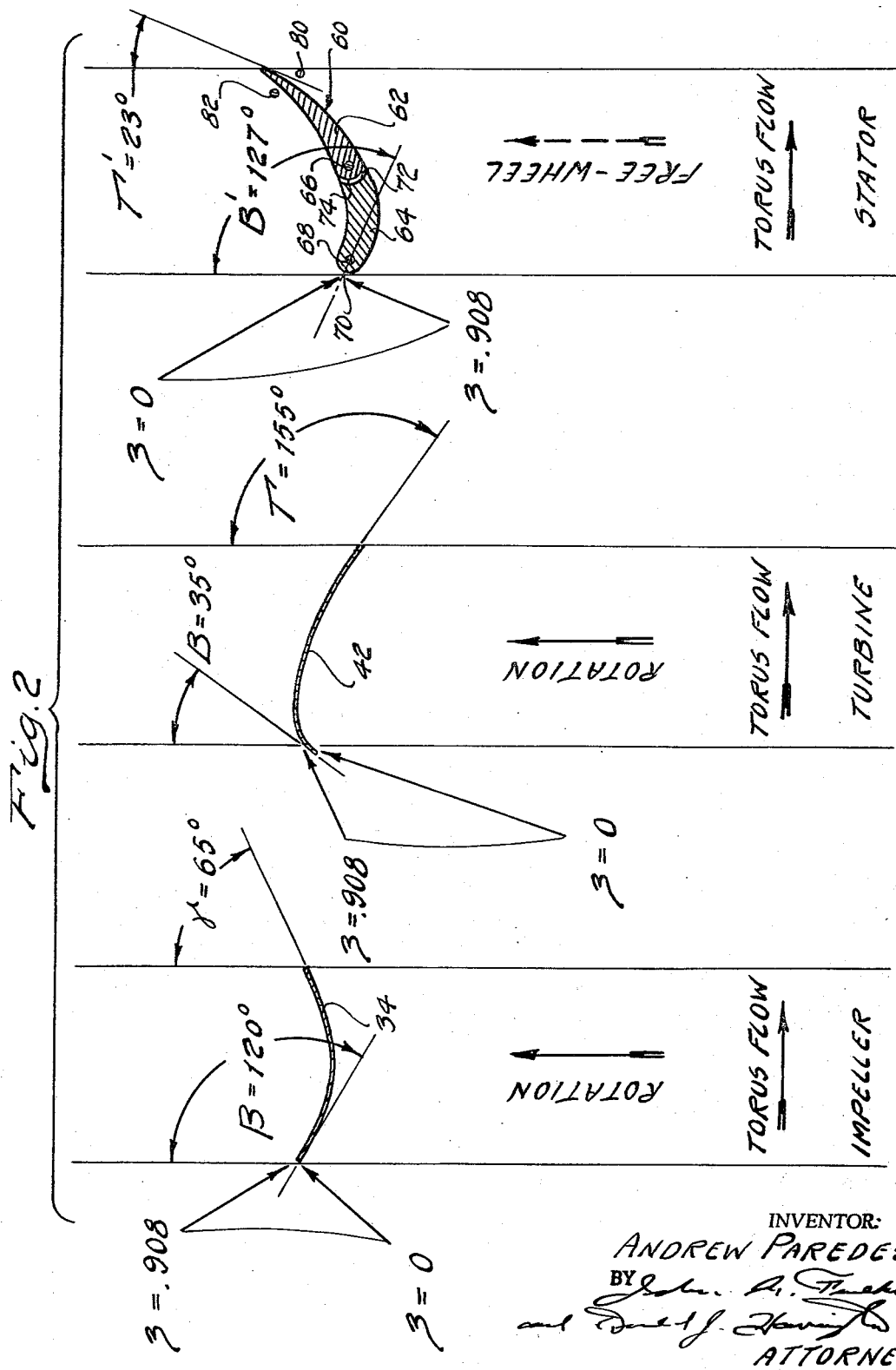
FIGURE 2 is a vector diagram schematically illustrating the geometry of the blading for the converter mechanism of FIGURE 1 and the flow vectors for particles of fluid passing through the bladed passages of the members of the unit of FIGURE 1.

In order to appreciate more fully the hydrokinetics that are involved in my improved converter mechanism, reference should be made now to FIGURES 2 and 3. In FIGURE 2 I have shown schematically by means of a blade cascade layout the blade geometry for a typical embodiment of my invention. The blade shown in the cascade view of FIGURE 2 is obtained by unwrapping the torus circuit into a flat plane. The direction of the torus flow in such a layout is from left to right as indicated by the directional arrow. The rotation vectors for the turbine and the impeller are vertically upward as viewed in FIGURE 2.

In FIGURE 2, I have illustrated the direction of the fluid flow vectors at the entrance region of each blade. For each vector I have designated a speed ratio. At the impeller entrance the absolute fluid flow velocity vector is substantially aligned with respect to the entrance region of the blade, which is situated at an angle $\beta$. As the speed ratio of the converter decreases, however, the direction of the vector at the entrance region of the blade 34 becomes substantially misaligned with respect to the entrance region of the blade.

At the entrance region of the turbine blades 42, the change in the direction of the absolute fluid flow velocity vector is less extreme. This is observed readily by comparing the direction of the flow vector at a speed ratio of .908 with the direction of the same vector when the speed ratio is zero.

The absolute fluid flow velocity vector changes direction in a rather extreme fashion at the entrance region of the stator blade segment 64. This is observed by noting in FIGURE 2 the absolute fluid flow velocity vector at zero speed ratio approaches the entrance of section 64 in an extreme, acute angle with respect to a vertical reference line.

The angularity of the absolute fluid flow velocity vector at the entrance region of the blade section 64 during coupling operation approaches the blade section 64 at an angle that is substantially greater than 90° with respect to the vertical reference line. This angle is substantially the same as the exit angle $\tau'$ for the blade section 62.

In FIGURE 3 I have illustrated the fluid velocity vectors for a particle of fluid at the exit region of each of the blade elements. For this purpose the symbol p represents the particle fluid at the exit region of the impeller blade 34. P represents a particle of fluid at the exit region of the turbine blade 42 and P' represents a particle of fluid at the flow exit section of the stator blade element 62. Other nomenclature is tabulated as follows:

$u_o$ = the linear velocity of the point p on the impeller blade 34 due to rotation of the impeller.

$U_o$ = represents the corresponding velocity of the point P on the turbine blade 42.

$f_o$ = represents the toroidal fluid flow velocity through the impeller blades in a direction normal to the direction of rotation.

$F_o$=the toroidal fluid flow velocity through the bladed passages of the turbine in a direction normal to the direction of rotation of the turbine.

$F_o'$=the toroidal fluid flow velocity through the bladed passages of the stator.

$\gamma$=the impeller blade exit angle.

$\tau$=the turbine blade exit angle.

$\tau'$=the stator blade exit angle.

$w_o$=the relative fluid flow velocity vector along the impeller blade at the impeller blade exit.

$W_o$=the relative fluid flow velocity vector along the blade at the turbine flow exit.

$W_o'$=the relative fluid flow velocity vector along the blade at the stator exit.

$v_o$, $V_o$ and $V_o'$=represent respectively the absolute fluid flow velocity vectors for the particles $p$, P and P'.

$s_o$=the tangential component of the absolute fluid flow velocity vector $\gamma_o$.

$S_o$=the tangential component of the absolute fluid flow velocity vector $V_o$.

$S_o'$=the tangential component of the absolute fluid flow velocity vector $V_o'$.

For purposes of comparing the performance of the converter when the stator blades assume the full line position, shown at FIGURE 4, with the corresponding performance that is obtained when the stator blades assume the dotted line position shown in FIGURE 4, expressions for torque ratio and size factor now will be developed.

For this purpose it is necessary to obtain expressions for the vectors $s_o$, $S_o$ and $S_o'$.

For the turbine, $S_o = U_o + F_o \cot \tau$. For the impeller, $s_o = u_o + f_o \cot \gamma$. In the case of the stator, $S_o' = F_o' \cot \tau'$.

The magnitude on the impeller torque is equal to the moment of momentum of a particle of fluid leaving the blades of the impeller less the moment of momentum of the fluid that enters the bladed passages of the impeller. But since the moment of momentum of the fluid that leaves the exit region of the stator is equal to the moment of momentum of the fluid that enters the entrance region of the impeller, the torque can be expressed as the difference in the moment of momentum of the fluid that leaves the impeller blades and the moment of momentum of the fluid that leaves the stator blades. This is represented algebraically as follows:

$$t = m_o r_o s_o - M_o' R_o' S_o'$$

In a similar fashion, turbine torque can be expressed as the difference of the moment of momentum of the fluid that leaves the flow exit section of the turbine blades and the moment of momentum of the fluid that leaves the exit section of the impeller blades. This is expressed algebraically as follows:

$$T = m_o R_o S_o - m_o r_o s_o$$

For purposes of this analysis the quantity $m_o$ equals the mass of the particle $p$. It is assumed, however, that this mass also equals the mass of the particle P and the mass of the particle P'. For this reason the symbol $m_o$ is used in the foregoing expressions for torque to the exclusion of corresponding expressions for the mass for the particles P and P'.

If we now assume that torque ratio, which will be represented by the symbol $\rho$, is equal to T divided by $t$, the expressions for torque can be computed. The value for $\rho$ and the value for $f_o$ can be represented algebraically. For this purpose $m_o$=the flow ($f_o$) x the cross-sectional area of the torus circuit of the impeller outlet x the density of the fluid in the embodiment shown. This is equal to .278 $F_o$ in a preferred form of my invention.

My formula then can be written as follows:

$$t = .00697 n f_o - .11078 f_o^2$$

$n$=impeller r.p.m.

Similarly, the turbine torque can be expressed a follows:

$$T = .001998 N f_o - .20295 f_o^2 - .006975 n f_o$$

when $N$=turbine r.p.m.

If these values for $t$ and $T$ are substituted into the foregoing expression for torque ratio, it is possible to compute flow, $f_o$, in terms of $\rho$. If this is done and if the symbol $\eta$ is substiuted for the expression $N/n$, the speed ratio, the following expression for flow is obtained:

$$\frac{(\rho - 1 + .2861 \rho)n}{15.90 \rho + 29.1}$$

If we now refer to the expression for impeller torque, it is apparent that the magnitude of the impeller torque depends upon the quantity $S_o'$. This quantity in turn is determined by the angle $\tau'$. If $\tau'$ decreases, the quantity $\cot \tau'$ increases. If the quantity $\cot \tau'$ increases, then the quantity $S_o'$ also increases. This then would result in a decrease of the value of $t$. Thus for any given flow the torque ratio increases as the blade section 62 is adjusted to the performance position shown at FIGURE 4 by means of full lines.

In order to understand the effect of the adjustment of the stator blade sections on the entrance conditions, reference will be made again to the vector diagram of FIGURE 3. In this diagram the same symbols have been used as in the case of FIGURE 2 to represent the motion of a particle of fluid at the entrance section of each of the blade elements. Although the subscript $i$ has been introduced in each case, the angles for the impeller, the turbine and the stator at their respective entrance regions have been designated by the symbols $\beta_a$, $B_a$ and $B_a'$. By employing expressions for torque based on the principle of conservation of momentum, the angularity of the entrance vectors of FIGURE 2 can be computed. It will be seen that when the blade section 62 is adjusted to the high performance position, the entrance region of the section 64 becomes aligned to a greater degree with the absolute fluid flow velocity vector. At zero speed ratio, this greatly improves the flow characteristics through the stator and shock losses are avoided.

In a similar fashion when the blade section 62 is adjusted to the performance position, the entrance region of the section 64 assumes to a greater degree a position that is in alignment with the direction of the absolute fluid flow velocity vector at high speed ratios. Again an optimum flow entrance condition is achieved as shock losses are reduced.

In order to determine the influence of the blade adjustment on size factor, an expression for size factor can be obtained as follows:

$$K = \frac{n}{\sqrt{t}} = \frac{60\omega}{2\pi} = \frac{9.5493\omega}{\sqrt{t}}$$

By using the known relationships between T and $t$, the following expression for size factor can be obtained:

$$K = \frac{9.5493}{\sqrt{.0112 l_o A (r_o^2 + r_o A \cot \gamma - R_o' l_o \cot \tau')}{L_o'}}}$$

where $$A = \frac{f_o}{\omega}$$

$\omega$=angular velocity of impeller
$l_o$=cross-sectional area at impeller outlet
$L_o'$=cross-sectional area at stator outlet In the foregoing expression for K, it is seen that if the value of $\cot \tau'$ increases upon a decrease in the magnitude of the angle $\tau'$, the quantity under the square root sign will decrease. This, of course, means that the size factor will increase. This demonstrates that the size facincreases whenever the blade section 62 is adjusted the high performance position.

The blades 60 will assume either one position or the ther depending upon the direction of the fluid flow locity vectors at the entrance region of the blades. When e entrance angle for the flow vector at zero speed ratio sumes the value illustrated in FIGURE 2, the blades will respond to cause a maximum change in direction. s the direction of the flow vectors approach the value presented in FIGURE 2 for the coupling point vectors, e angle $\tau'$ will increase to produce a flow exit vector r the stator that is favorable for high efficiency cruising erformance.

Having thus described a preferred form of my invention, what I claim and desire to secure in a United States etters Patent is:

1. A hydrokinetic torque converter comprising an impeller, bladed stator and bladed turbine situated in toroidal uid flow relationship in a common torus circuit, said ator being situated between the flow exit region of said irbine and the flow entrance region of said impeller and eing comprised of two flow directing portions and means or individually mounting each stator portion for adjustment about radial axes to provide a fluid flow passage arough said stator of variable geometry.

2. A hydrokinetic torque multiplying mechanism comprising a bladed impeller, a bladed stator and a bladed irbine situated in toroidal fluid flow relationship, said tator comprising fluid directing blades situated at a adially inward region of said circuit, said stator blades omprising separate fluid directing blade portions, and leans for independently adjusting each stator blade portion about a separate radial axis whereby the geometry if the fluid flow passages defined by said stator blades an be controlled.

3. A hydrokinetic torque converter mechanism comprising a bladed impeller, a bladed turbine and a bladed tator situated in toroidal fluid flow relationship, said tator comprising a plurality of stator blades situated between the flow exit region of said turbine and the flow intrance region of said impeller and having separate fluid lirecting blade portions, one portion being situated in he flow entrance region of said stator and the other portion being situated in the flow exit region of said stator, he trailing edge of said one portion being disposed in registry with the leading edge of the other portion whereby said stator blade portions define a continuous fluid directing blade assembly, and means for independently mounting each blade portion for rotary motion about separate, radially outwardly extending axes whereby one blade portion may be adjusted about its axis in a clockwise direction when viewed from a reference point on the axis of said converter mechanism while the other blade portion is adjusted simultaneously in a counter-clockwise direction.

4. An adjustable stator assembly for use in a hydrokinetic power transmission mechanism comprising a stator hub, fluid flow directing blades situated in angularly spaced relationship about said hub, each blade comprising separate entrance and exit portions, means for independently mounting each blade portion for adjustment about a radially outwardly disposed axis, one margin of one blade portion being situated in registry with one margin of the other blade portion whereby said blade portions define continuous, flow directing blade assemblies, and means for limiting the degree of adjustment of one blade portion about its axis in either direction thereby establishing either of two operating positions.

5. The combination as set forth in claim 1 whereby said blade portions include mechanical articulated connections between the adjacent edges of the blade portions whereby angular adjustment of one blade portion in one angular direction will effect simultaneous adjustment of the other blade portion in the other angular direction thus providing an optimum flow entrance blade geometry as well as the flow exit blade geometry for augmented converter performance at high speed ratios as well as low speed ratios.

6. The combination as set forth in claim 2 whereby said blade portions include mechanical articulated connections between the adjacent edges of the blade portions whereby angular adjustment of one blade portion in one angular direction will effect simultaneous adjustment of the other blade portion in the other angular direction thus providing an optimum flow entrance blade geometry as well as the flow exit blade geometry for augmented converter performance at high speed ratios as well as low speed ratios.

7. The combination as set forth in claim 3 whereby said blade portions include mechanical articulated connections between the adjacent edges of the blade portions whereby angular adjustment of one blade portion in one angular direction will effect simultaneous adjustment of the other blade portion in the other angular direction thus providing an optimum flow entrance blade geometry as well as the flow exit blade geometry for augmented converter performance at high speed ratios as well as low speed ratios.

8. The combination as set forth in claim 4 whereby said blade portions include mechanical articulated connections between the adjacent edges of the blade portions whereby angular adjustment of one blade portion in one angular direction will effect simultaneous adjustment of the other blade portion in the other angular direction thus providing an optimum flow entrance blade geometry as well as the flow exit blade geometry for augmented converter performance at high speed ratios as well as low speed ratios.

9. The combination as set forth in claim 5 wherein said articulated connections comprise a projection formed in one of the adjacent edges of said blade portions and a cooperating recess formed in the other companion edge of the other blade portion, said projection being formed with an elongated slot, and an adjusting element carried by the leading edge of the other blade portion in registry with said slot whereby rotary adjustment of one blade portion will effect rotary adjustment of the other blade portion in the opposite sense.

10. The combination as set forth in claim 6 wherein said articulated connections comprise a projection formed in one of the adjacent edges of said blade portions and a cooperating recess formed in the other companion edge of the other blade portion, said projection being formed with an elongated slot, and an adjusting element carried by the leading edge of the other blade portion in registry with said slot whereby rotary adjustment of one blade portion will effect rotary adjustment of the other blade portion in the opposite sense.

References Cited

UNITED STATES PATENTS

| | | | |
|---|---|---|---|
| 2,122,169 | 6/1938 | Wilson | 60—54 |
| 2,205,794 | 6/1940 | Jandasek | 60—54 |
| 2,755,628 | 7/1956 | Mamo | 60—54 |
| 3,014,430 | 12/1961 | Schneider | 60—54 |
| 3,187,511 | 6/1965 | Gabriel | 60—54 |

EDGAR W. GEOGHEGAN, *Primary Examiner.*